(12) United States Patent
Thomas

(10) Patent No.: US 6,377,283 B1
(45) Date of Patent: *Apr. 23, 2002

(54) MAN-MACHINE INTERFACE FOR A CUSTOM TABULAR DISPLAY

(75) Inventor: Robert P. Thomas, Ellington, CT (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,167

(22) Filed: Sep. 17, 1998

(51) Int. Cl.[7] .............................. G06F 3/00; G06F 19/00
(52) U.S. Cl. ....................... 345/762; 345/765; 345/763; 345/810; 700/291; 700/295
(58) Field of Search ................................. 345/333, 334, 345/970, 339, 352, 965, 762, 765, 763, 810, 771; 700/286, 291, 295; 702/57, 60, 80

(56) References Cited

U.S. PATENT DOCUMENTS

| | | | | |
|---|---|---|---|---|
| 5,611,059 A | * | 3/1997 | Benton et al. | 345/326 |
| 5,774,667 A | * | 6/1998 | Garvey et al. | 345/333 |
| 5,859,637 A | * | 1/1999 | Tidwell, II | 345/336 |
| 5,859,885 A | * | 1/1999 | Rusnica et al. | 376/259 |
| 5,867,157 A | * | 2/1999 | Goddard et al. | 345/333 |
| 5,903,476 A | * | 5/1999 | Mauskar et al. | 716/1 |
| 5,969,717 A | * | 10/1999 | Ikemoto | 345/333 |

FOREIGN PATENT DOCUMENTS

| | | | | |
|---|---|---|---|---|
| EP | 0 617 356 A1 | 9/1994 | | G06F/3/023 |
| EP | 0 676 709 A2 | 10/1995 | | G06F/19/00 |

OTHER PUBLICATIONS

"InTouch 7.1 Product Data Sheet", Nov. 1999, Wonderware Corporation, Irvine, CA, USA, XP002127505, the whole document.

* cited by examiner

Primary Examiner—Raymond J. Bayerl
Assistant Examiner—Cuong T. Thai
(74) Attorney, Agent, or Firm—Cantor Colburn LLP (57) ABSTRACT

A power management control system ("PMCS") provides control and graphical representation of a plurality of electrical devices and components of an electrical distribution system. The PMCS includes a customized tabular display with database links for viewing selected, metered data provided by various intelligent electronic devices and components of the electrical distribution system. The Custom Table Wizard provides a simple method of selecting and displaying important parameters to the user during operation of the PMCS. The custom table graphic includes approximately 1 to 12 rows of information representative of selected, metered data of the selected device. The development of a custom table display is automated using software, namely a Custom Table Wizard. The Custom Table Wizard automates the configuration of the customized tabular display, which is user configurable, and thereby enables the integrator to generate a tabular data interface quickly without programming skills. The Custom Table Wizard is also file driven and therefore, a new device and its associated tag information may be added by simply editing the associated files. The Custom Table Wizard also allows editing of data descriptions and units, thereby allowing wizard to be used in international language applications.

24 Claims, 12 Drawing Sheets

| Line 1_760_X3:  Cell 3 Corner device, near Fred's desk | | |
|---|---|---|
| Phase A Current | #### ### | Amps |
| Phase B Current | #### ### | Amps |
| Power Factor | #### ### | Ld/Lag |
| Phase N Current | #### # | Amps |
| Phase G Current | #### # | Amps |
| Line Voltage A-N | #### # | kVolts |
| Line Voltage B-N | #### # | kVolts |
| Line Voltage C-N | #### # | kVolts |
| Phase Voltage A-N | #### # | kVolts |
| Phase Voltage B-N | #### # | kVolts |
| Phase Voltage C-N | #### # | kVolts |

InTouch-WindowViewer-C:\INTOUCH.32\BRET

File | Logic | Special | | Development

EPM3720 Normal Metering Values

| | A | B | C | | Three Phase Values | |
|---|---|---|---|---|---|---|
| Voltage L-N: | 0 | 0 | 0 | Avg. Voltage L-N: | | 0 |
| Current | 0 | 0 | 0 | Avg. Voltage L-L: | | 0 |
| kV: | 0 | 0 | 0 | Ave. Current: | | 0 |
| KVA: | 0 | 0 | 0 | Total kW: | | 0 |
| kVAR | 0 | 0 | 0 | Total kVA | | 0 |
| PF(%): | 0 | 0 | 0 | Total kVAR | | 0 |
| | | | | Total PF (%): | | 0 |

| V AUX: | | 0 | Volts AB: | 0 |
|---|---|---|---|---|
| Neutral Current: | | 0 | Volts BC: | 0 |
| Frequency: | | 0.00 | Volts CA: | 0 |
| Voltage Unbalance (%): | | 0 | | |
| Current Unbalance (%): | | 0 | | |

| | Total | Import | Export | Net |
|---|---|---|---|---|
| kWH: | 0 | 0 | 0 | 0 |
| kVARH: | 0 | 0 | 0 | 0 |
| kVAH: | 0 | 0 | 0 | 0 |

Metering | Thermal Dmnd | Sliding Dmnd | Setup 1 | Setup 2 | Setpoints

Device Name: E3720
Group Name: RACK 45
Voltage Scale: 0
Current Scale: 0
Mobus Address: 0
Meter Rev: 0.0.0.0

Event Logger | Trend | Help
| Wave | Exit

MAN-MACHINE INTERFACE FOR A CUSTOM TABULAR DISPLAY

BACKGROUND OF THE INVENTION

The present invention relates generally to a power management control system and in particular, to software that permits rapid development of a customized tabular graphic that permits viewing of data provided by a selected electronic device of a power management control system.

Power management control systems monitor and control a variety of intelligent electronic devices of an electrical distribution system. The power management control system includes a computer connected to a common bus, which allows the electronic devices to communicate with a server. The control system provides graphical representations of the devices of the distribution system that enables a user to monitor and operate the distribution system.

Current PMCS use full Tabular Device Wizards that offer an easy-to-integrate view of an entire device register map of all the corresponding parameters of the device. Many of the Tabular Wizards however, create between 200 and 400 InTouch DDE Tags, which correspond to parameters of the device. This number of DDE Tags not only increases the size of the InTouch database, but can result in a large amount of Modbus traffic. For operators that are only interested in viewing a limited number of registers on a device (e.g. less than 20 registers), the overhead of the full Tabular wizards may be too much to justify their use on a particular screen. Integrators are often creating screens today, by hand, in order to get a quick view of the most important data in their application on a single screen. These custom tables having a substantially reduced list of parameters are most often viewed by the end user. The configuration of such a custom table for each device is time-consuming and requires the integrator to have programming skills.

BRIEF SUMMARY OF THE INVENTION

This invention offers advantages and alternatives over the prior art by providing a Custom Table Wizard for a power management control system that automates the development of a custom table. The Custom Table Wizard provides automated configuration of a custom table graphic for a device of an electrical distribution system. The Custom Table Wizard provides a rapid and cost effective method to enable an integrator to select a small number of important parameters of an electronic device for a custom table graphic. Further, the Wizard is file driven and therefore, devices added to the distribution system in the future may be easily supported by the wizard by simply editing a pair of files.

In accordance with a present invention, a method is provided for generating a custom tabular display of operating data of an intelligent electronic device of an electrical distribution system. The method includes selecting a custom table wizard. The wizard then prompts the integrator to select a device that the integrator wishes to generate a custom table therefor. A server of a power management control system, which monitors a predetermined number of parameters of the selected device, provides a list of parameters of the selected device. The integrator then selects at least one parameter from this list of parameters. A navigational link is provided between the server and the custom table wizard for displaying the selected parameter in a table.

BRIEF DESCRIPTION OF THE DRAWINGS

Referring now to the drawings wherein like elements are numbered alike in the several FIGURES.

DETAILED DESCRIPTION OF THE INVENTION

Figure 1:
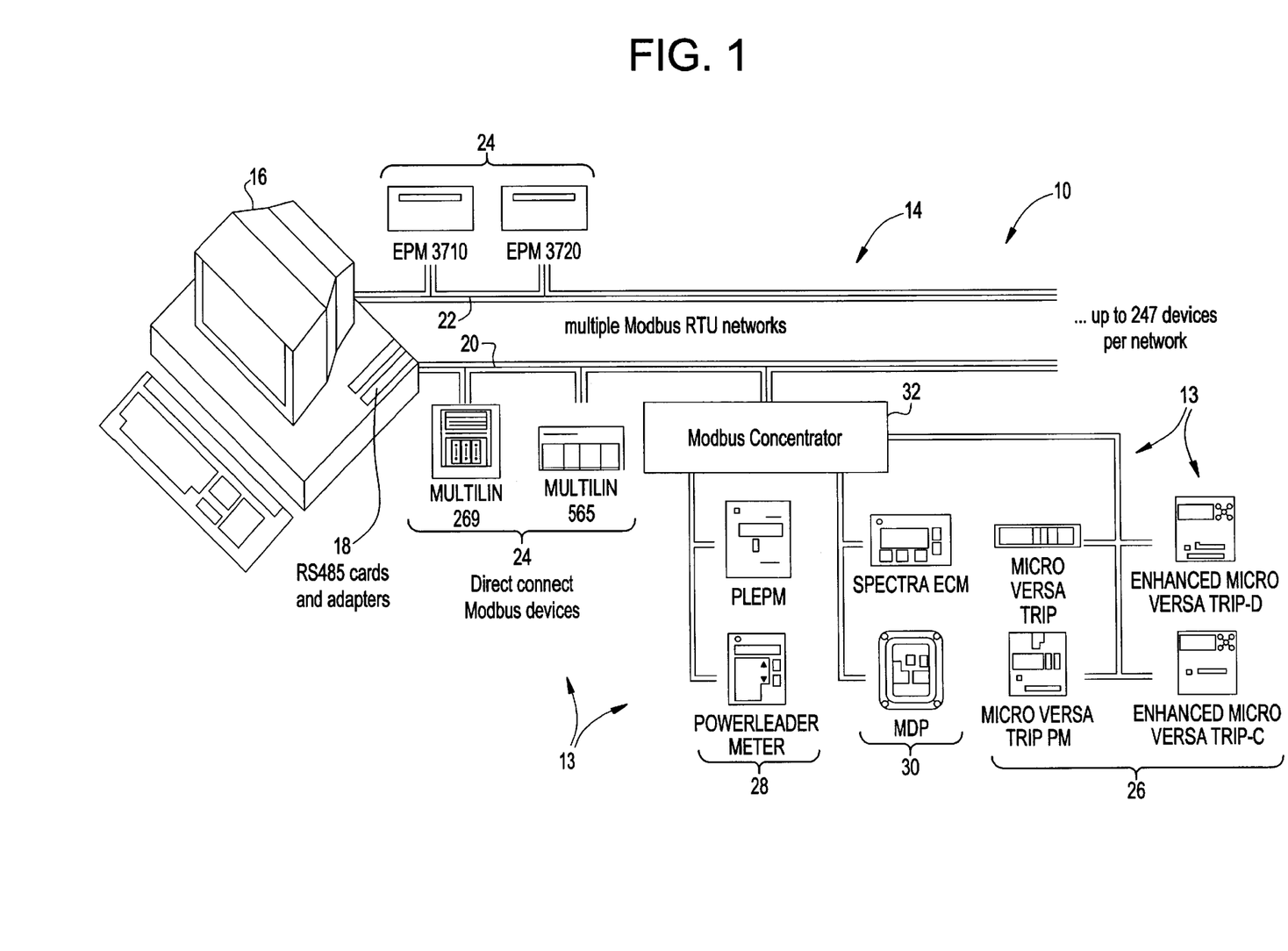
FIG. 1 is a diagrammatic block diagram of a power management and control system in accordance with the present invention.

Referring now to FIG. 1, a power management control system ("PMCS"), generally designated 10, provides a customized tabular graphic 12 (see FIG. 2) with database links for viewing selected metered data provided by various intelligent electronic devices and components 13 of an electrical distribution system 14. The PMCS 10 comprises a computer 16, e.g., an IBM-PC AT compatible machine which is based on a Pentium processor, having standard RS485 interface cards 18, or an RS232 to RS485 convertor, and adapters installed in its I/O slots. The computer 16 contains software for monitoring and controlling selected aspects of power usage/consumption, as described in more detail hereinafter. Cards 18 provide I/O ports, which define multiple industry standard Modbus RTU networks 20 and 22. The Modbus RTU protocol is a well-known industry standard. Devices with a Modbus RTU interface can be connected directly to the Modbus, e.g., control devices 24, such as, Multilin models 269 and 565 and power management EPM 3710 and EPM 3720. Other devices communicate on the Commnet protocol and include trip units 26, e.g., Trip, Enhanced Trip-D, Trip PM and Enhanced Trip-C Units, which are commercially available from General Electric Co., meters 28, e.g., Power Leader Meters commercially available from General Electric Co., and relays 30, e.g., General Electric Co.'s Spectra ECM and Power Leader MDP. A Modbus concentrator 32 provides an interface between the Modbus RTU protocol and the Commnet protocol, whereby these devices can communicate through Modbus concentrator 32 over the Modbus. In this example, up to thirty-two devices (i.e., direct connect devices or Modbus concentrators) can be connected to each Modbus RTU network.

Figure 2:
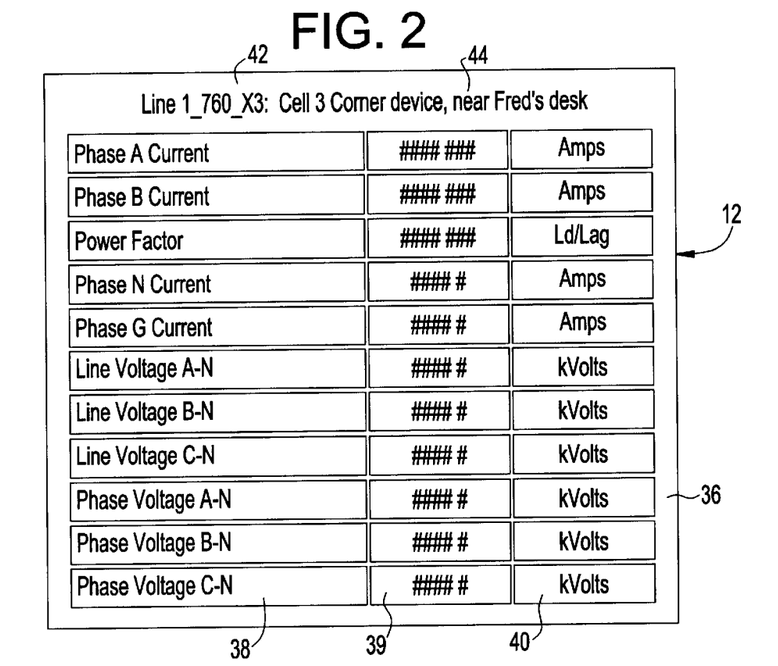
FIG. 2 is a view of a custom tabular display window generated by computer software embodying the present invention.

Referring to FIG. 2, the display of the customized tabular graphic 12 includes a table 36 having eleven rows of information representative of selected data provided by a device 13 of the distribution system 14. Each row has three fields wherein the first field 38 is a description of the data provided by the electronic device 13, the second and third fields 39, 40 are the value and units of the measured parameter, respectively. For example, the data provided in the first row is for the phase current in amperes for phase A. The table 36 may comprise 1 to 12 rows of information.

Each table 36 is identified by the Device Name 42 for the electronic device 13 and an optional description 44 provided by the integrator of the PMCS 10. For example, the custom table 36 in FIG. 2 has a Device Name 42 of "Line1_760_X3" and a description 44 of "Cell 3 Corner device, near Fred's Desk".

The development of a custom table display 12 is automated using software, namely a Custom Table Wizard. The Custom Table Wizard provides the automated configuration of the customized tabular graphic 12 which is user configurable, and thereby enables the integrator to generate a tabular data interface quickly without programming skills or the need to test and validate the object each time the table 36 is used. The Custom Table Wizard provides a rapid and cost effective method by which to develop a custom table display 12. Previous implementations of a custom table display required custom programming by the integrator developing the system. The Custom Table Wizard allows the user to generate the custom table display 12 without any programming skills or detailed device knowledge, as will be described in greater detail hereinafter. Another advantage of the custom table 36 is that the dimension of the table is approximately one-quarter of the screen of the computer 16, and therefore permits four tables to be simultaneously displayed to the user without having to toggle between tables or move tables to view another table displayed on the screen. The Custom Table Wizard also provides a simple method of selecting and displaying important parameters 38 to the user during operation of the PMCS 10.

Figure 3:
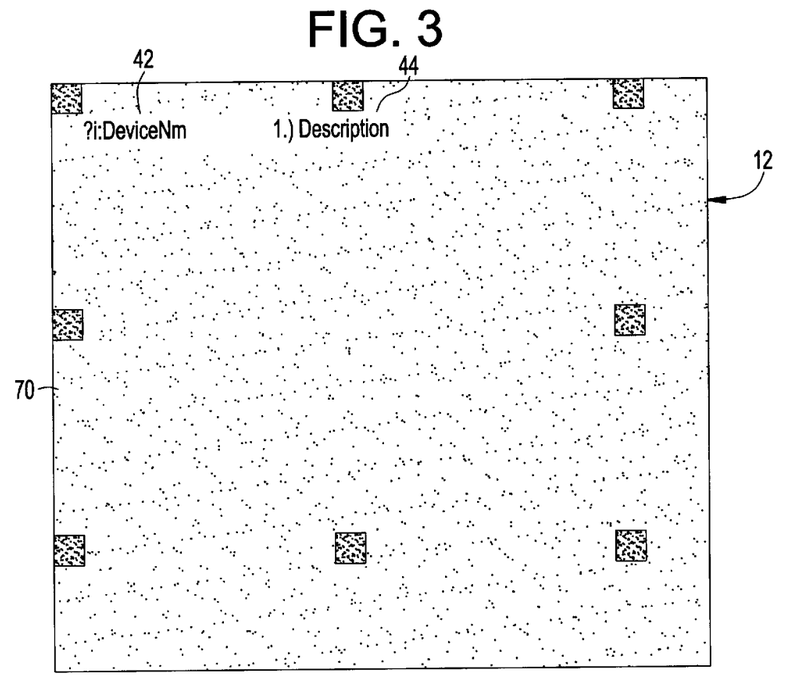
FIG. 3 is a view of a custom tabular display window of FIG. 2 prior to configuration.

When the integrator drops the Custom Table Wizard into the InTouch application, it appears as shown in FIG. 3, as unconfigured with placeholders for the information. At this point the integrator double clicks on the Custom Table Wizard in order to configure the tags used by the wizard, as will be described in greater detail hereinafter.

Figure 4:
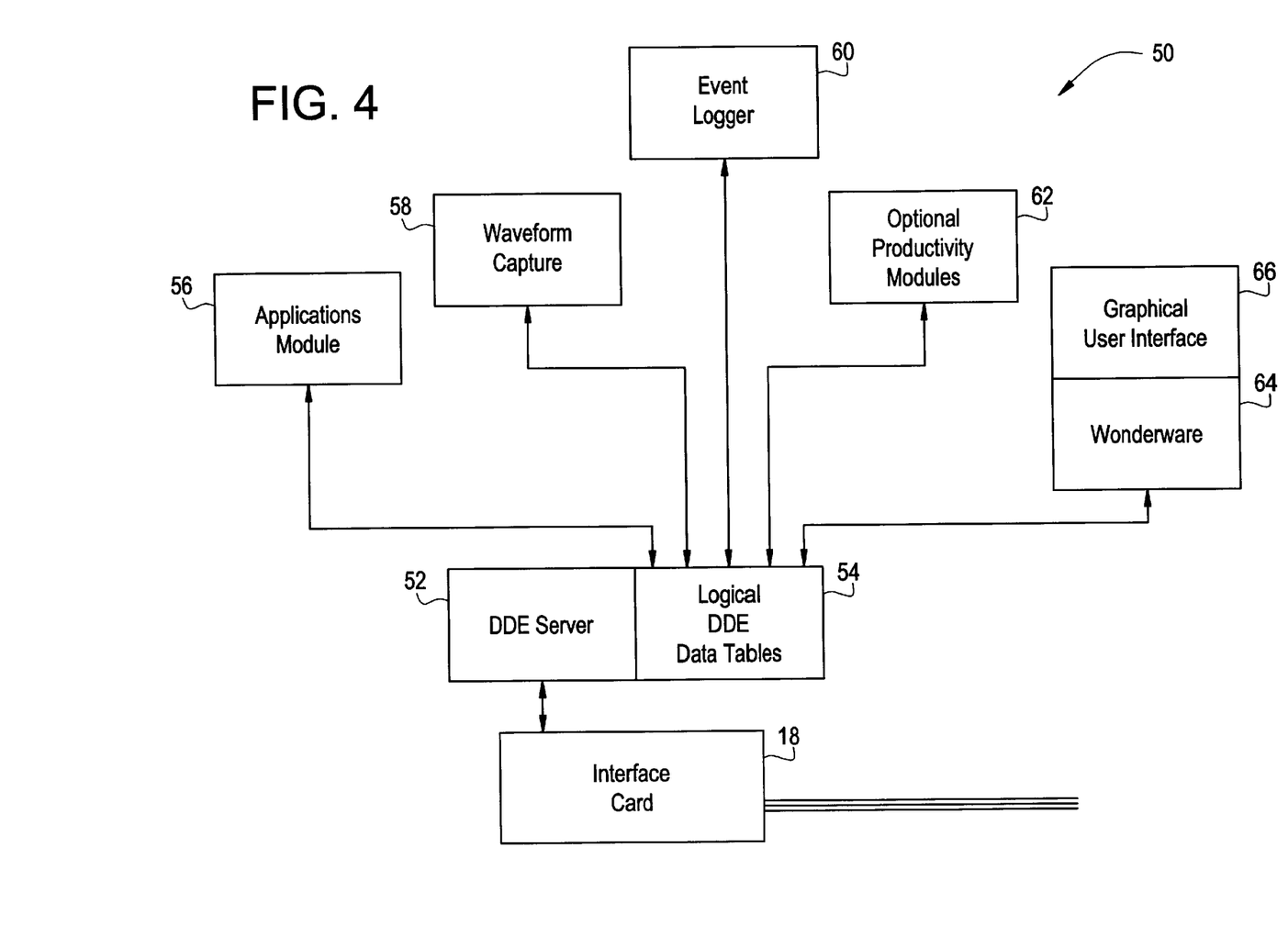
FIG. 4 is a block diagram of the computer software used in the power management and control system of the present invention.

Referring now to FIG. 4, a block diagram 50 of the software for monitoring and controlling selected aspects of power usage/consumption of the PMCS 10, discussed above, is generally shown. This software is loaded into the computer 16 and includes a dynamic data exchange (DDE) server 52. DDE server 52 allows external programs to access power management data in a Microsoft Windows environment. Data interface to DDE server 52 is provided by the system through a Wonderware InTouch utility. The DDE server is a 32 bit application under Windows NT. A configuration and control interface for the DDE server is provided through server application window menus. Associated with DDE server 52 are logical data tables 54 and related modules, i.e., an Excel or other DDE aware applications module 56, a waveform capture module 58, an event logger module 60, productivity modules 62, and a Wonderware InTouch module 64. Module 64 includes a tool kit for building screens and interfaces, and a graphical user interface 66 for monitoring and control of the electrical distribution system. The graphical user interface 66 for the server operates in 32 bit Windows or Windows NT environment and InTouch library functions. Waveform capture module 46 provides for viewing and analysis of waveforms (e.g., Fourier, frequency and/or harmonic analysis) captured by sophisticated metering devices. Event Logger module 60 provides for viewing, organizing and analyzing unusual behavior in a power system. Productivity modules 62 include, for example, a cost allocation module and a load management module. The cost allocation module provides for tracking power consumption to the sub-unit level, developing internal billing methods and reports, and thereby reducing cost. The load management module provides for tracking power demand and automatically shedding non-critical loads to prevent peak demand penalties, and provides for timer-based control to reduce power consumption. DDE server 52 communicates though the interface card 18 shown in FIGS. 1 and 4.

The event logger module 60 includes a utility that passes a received message as an un-acknowledgeable or acknowledgeable alarm or as an event based upon the contents of an initialization file. The DDE server 52 ensures that all events are cast in the same format so that the event logger module 60 can interpret each event. Electrical meters 28 and control/protection devices 26 use various codes to describe occurrences to the circuits that are monitored or controlled. A file collates these codes into three categories for analysis. These three categories for any particular device are modifiable for the code received from a device. The three categories are 'ACK/UNACK' for acknowledgeable alarms, '-' for alarms requiring no acknowledgment, and "EVENTS" for merely reporting the device status.

The waveform capture module 58 includes a utility that provides an interface to configure and display data from a device that transmits waveform data. These devices transmit waveform data with different formats. One uniform display format is desired for these different types of meters. This utility applies header information transmitted by the meter to correctly scale and display the comma separated value data transmitted by the devices as applicable.

Figure 5:
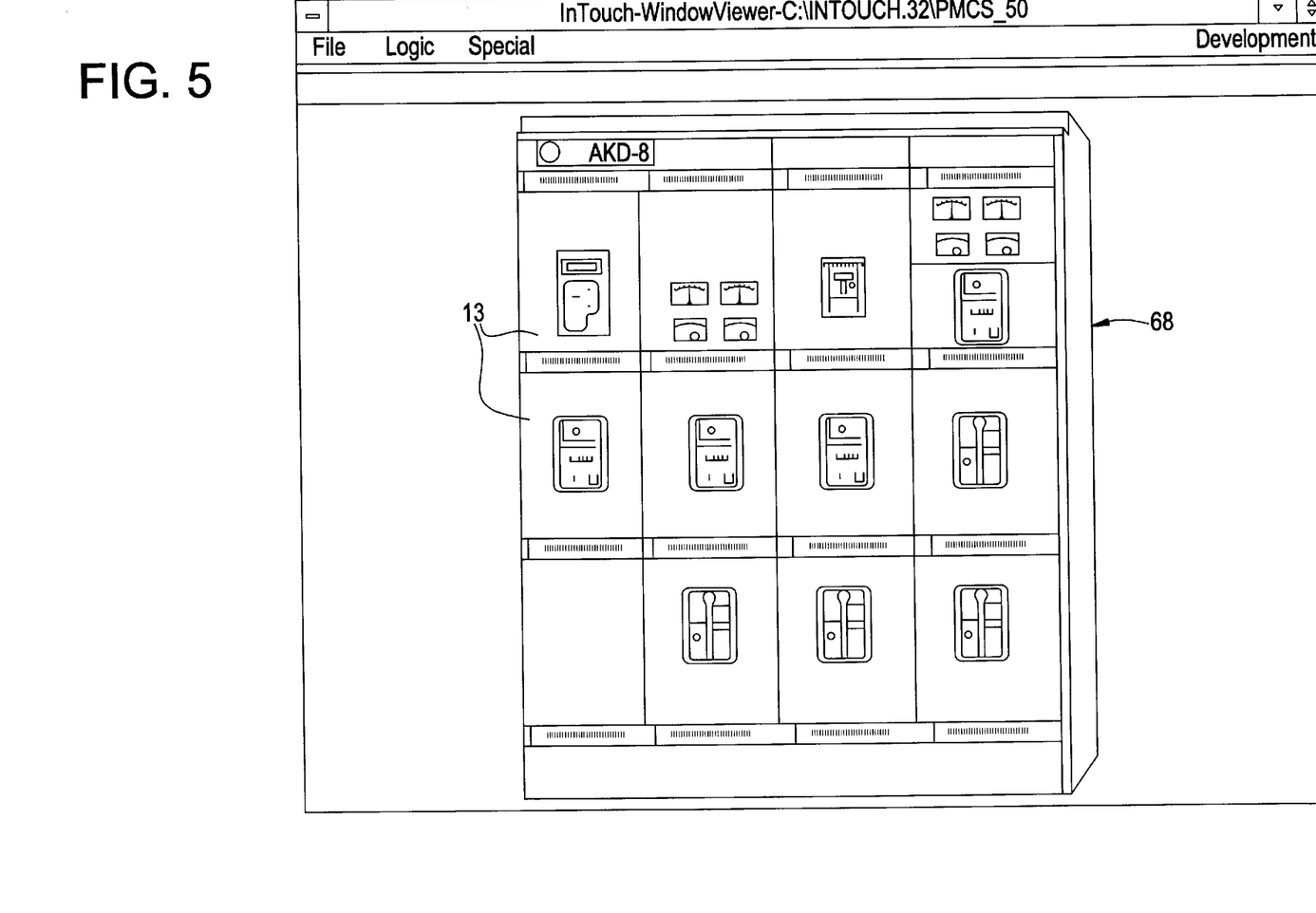
FIG. 5 is view of an InTouch—windowviewer window generated by the computer software of FIG. 4.
Figure 6:
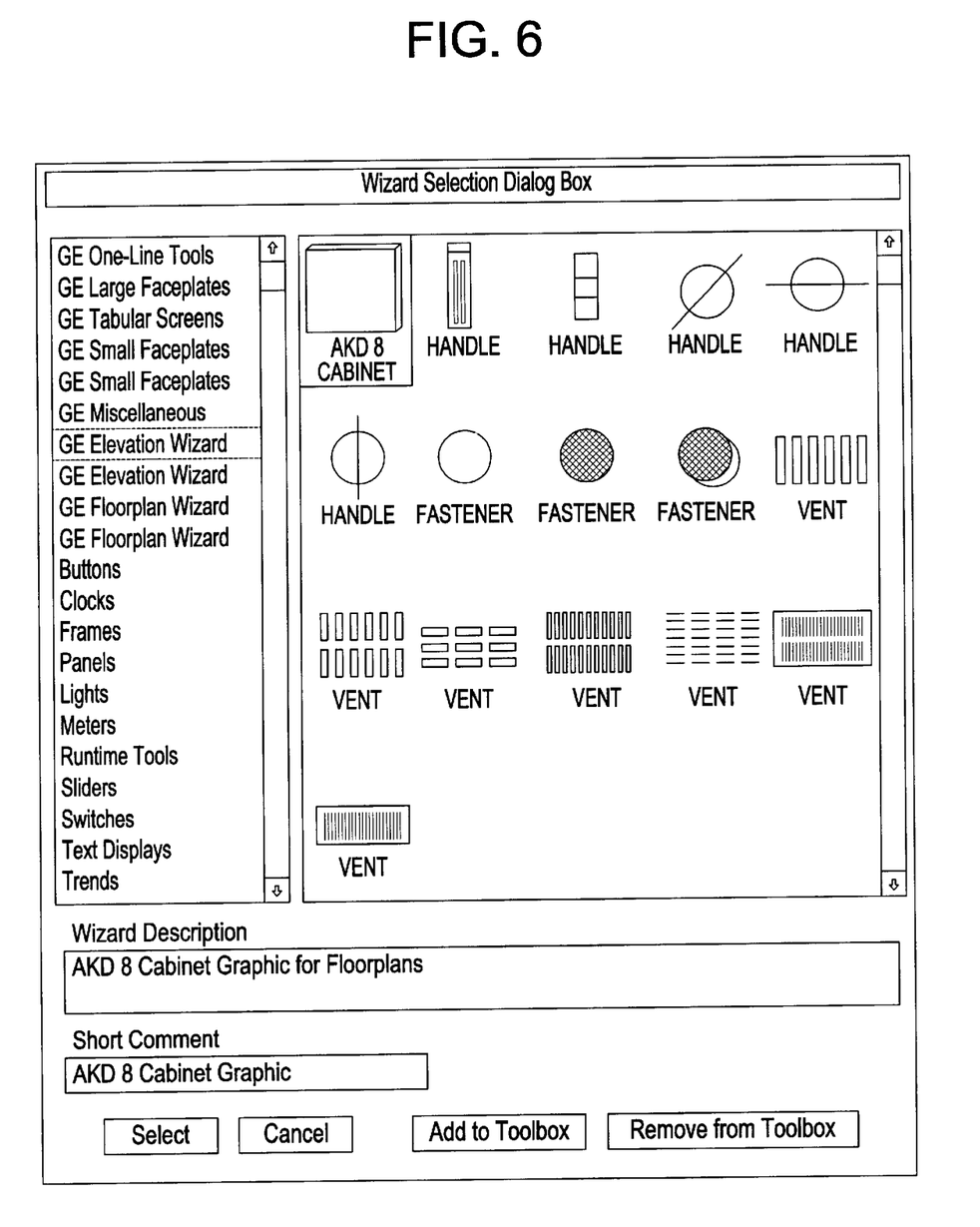
FIGS. 6–9 are views of wizard selection dialog box windows generated by the computer software of FIG. 4.
Figure 7:
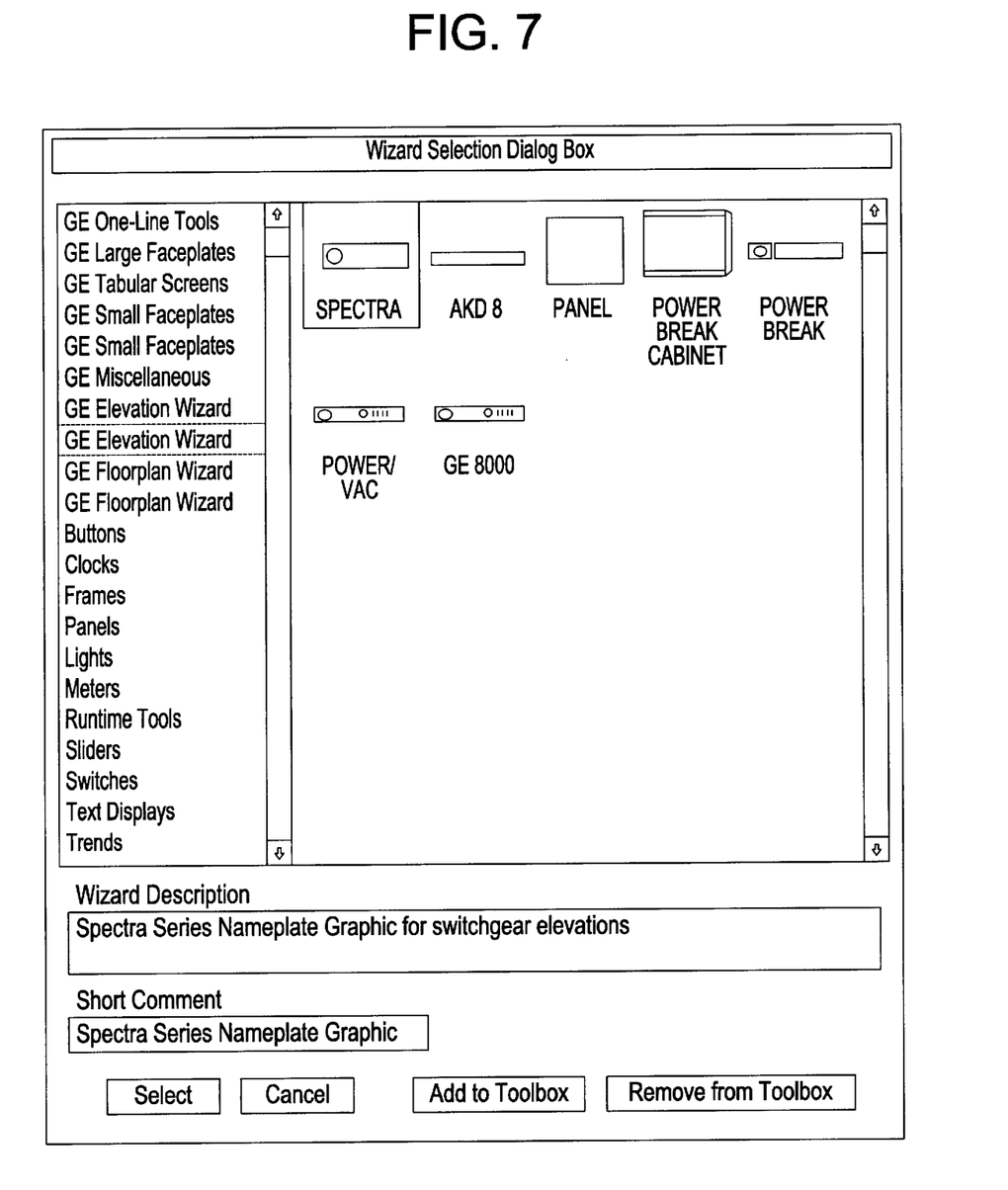
Figure 8:
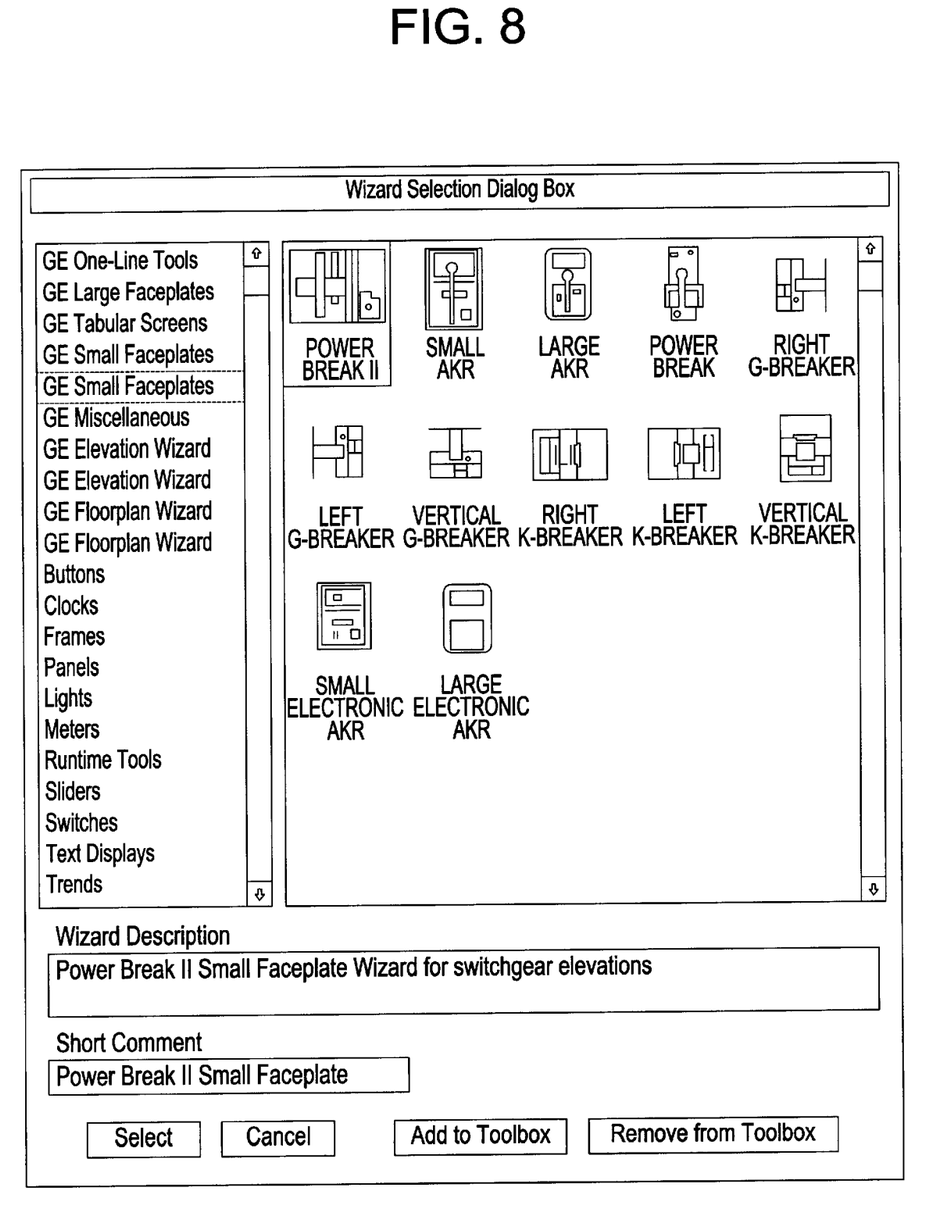
Figure 9:
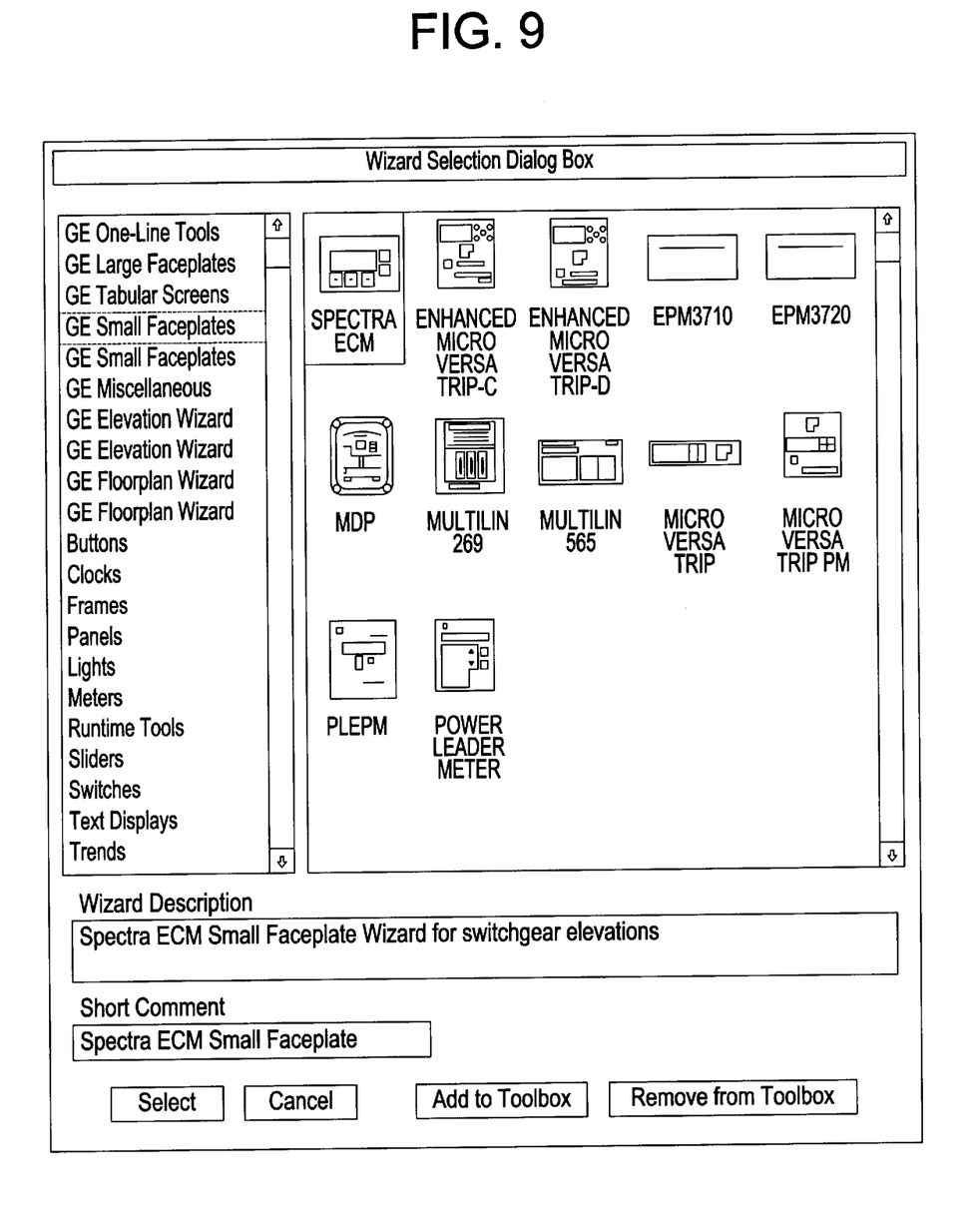

The Wonderware InTouch module 64 includes a software toolkit for rapid development of three-dimensional representations of electrical distribution switchgear 68, as shown in FIG. 5. These switchgear elevations have logical connections to the switchgear devices 13. Referring to FIG. 5, a typical switchgear elevation developed with the so-called Power Wizards illustrated in FIGS. 6–9 is shown. This elevation can be modified to any dimensions with an infinite number of combinations and arrangements of meters and protection devices to quickly and accurately represent a customer's switchgear. The Power Wizards eliminate the necessity to draw each individual component line by line. The user starts by selecting a cabinet wizard such as the AKD-8 or Power Break Cabinet to which handles, panels, and fasteners are added, FIGS. 6 and 7. Thereafter, circuit breakers 26 (FIG. 8), meters 28 and other protection devices (FIG. 9) are located or dropped onto the appropriate panels in the same locations as the customer's actual switchgear. These items have dialog boxes associated with them that are opened by double clicking on one of the Power Wizards once they have been dropped. From this dialog box a navigational link is established to another window that contains another Power Wizard that displays detailed metering, configuration, and control information.

Figure 10:
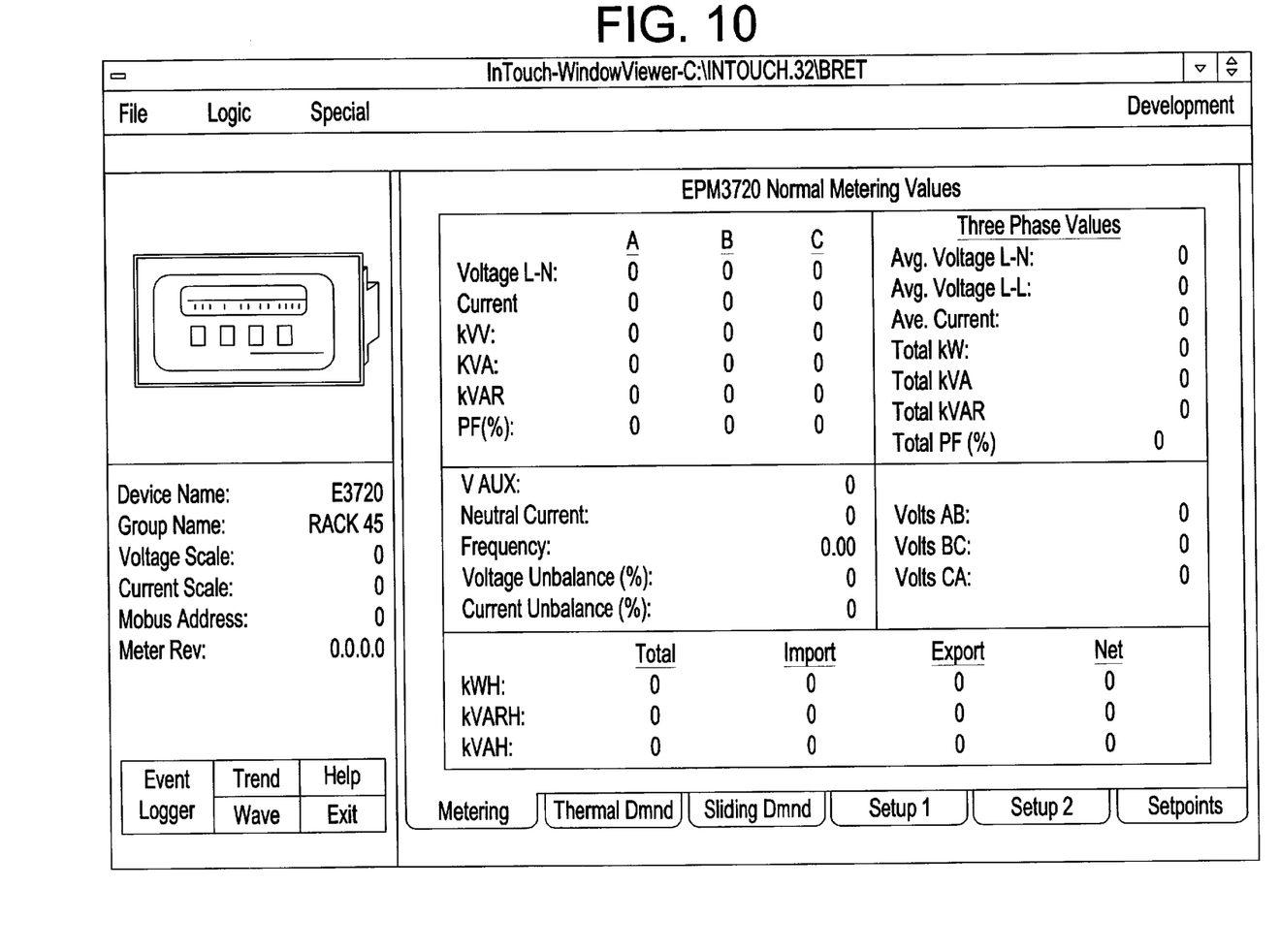
FIG. 10 is a view of an InTouch—windowviewer window generated by the computer software of FIG. 4.

Referring to FIG. 10, an example of a Power Wizard of a metering device 28. The Power Wizards instantly develop a standard looking interface for a particular device type. These Power Wizards also create from this standard interface, unique database links that the user defines by selecting a name and entering in this name from a Power Wizard dialog box. In this way the same wizard may be used over and over again but can be logically distinguished from another via the user-defined name for a device entered in the Power Wizard dialog box. All margins for error that may have occurred in manually entering in the data access links to a database server are removed by the Power Wizards capability to set them up automatically using a unique user defined device name.

Every windows application is registered in a windows kernel with an application name. To uniquely identify a data item for communication between two cooperating (DDE aware) windows applications, the data item is identified by tuple (Application, Topic, Item). Topic name provides a grouping, and item name specifies the actual data point to be accessed under a topic. For the DDE server 52, the application name is the server's executable name. Topic name can be the device identification name and item name can be the register identification of a field data point. For example, with a General Electric Co. EPM meter, the tuple can be GE32MODB, EPM1, AMP_A where GE32MODB is the Application name for a DDE Server, EPM1 is the meter identification name, and AMP_A is the current for phase A. DDE messages mainly include requests to send data as identified by the Topic and Item name. They may also be for set point download to the data point as identified by the Topic and Item names. Input parameter values are reported by field devices on the communication interface in response to a poll by the server. This value may be a float value, an integer value, a string or discrete status bits.

Set point registers are to be downloaded based on request from a DDE client, i.e., a program, for example, such as Wonderware InTouch 5.0 or MS-Excel, which request data items from the DDE server 52 and accepts data through DDE. The DDE server acts as a link between a client requesting device data and a field device, which can provide the data. The DDE server 52 communicates to the field device through communication ports and to the client via DDE message link. A client sends its requests to the server to read/write some device registers. The server maps each request to suitable device read/write request packets and carries out the necessary transaction with the device. Then it relays the result back to the client after processing and, if necessary, casts the collected device data to the proper format. Apart from reporting contents of normal device registers, the server can also collect special data like waveform capture/recording data from the device and pass it to a client.

A device type register map must be configured for each of the device topics connected thereto. The system provides for configuration of a starting valid address, a last valid address, and a set of invalid register blocks using this utility. Valid registers, in the present example, are R0XXXX; R1XXXX; R3XXXX; or R4XXXX. Accordingly, DDE server 52 supports the following Modbus register types; R0XXXX—Discrete coils, R1XXXX—Discrete status registers, R3XXXX—Input registers, and R4XXXX—Set point registers. With these generic types, a user can configure any number of register types. Each of these types will have poll rate attributes (i.e., Fast Poll, Slow Poll, or Poll Once). Buffered events, read/write date/time registers for time synchronization, waveform capture data and waveform recording data are implemented differently in the devices which support them hence, no common configuration utility is provided for these functions. The DDE server 52 handles each of these functions specifically. Again a mnemonic name is associated with a register address.

In general, the DDE server 52 uses the Modbus RTU protocol to communicate with a field device 13. The DDE server provides appropriate return values as specified for all clients, i.e., periodic polling packets for active topics and items, periodic polling packets for events and status, periodic update of time to all the devices, data value update to clients for acquired items, event/status report to InTouch so that it becomes part of normal alarm log, and status update for active topics (devices). Set point write requests are properly formatted set point download communication packets for the request. Execution and termination of the server are initiated on user request from the DDE server window menu.

As described hereinbefore, the Custom Table Wizard assists the integrator in the development of the customized tabular graphic 12 of the present invention, shown in FIG. 2. Specifically, the Custom Table Wizard interconnects selected field data points or parameters with the custom table graphic 12, and thereby provides a list of a reduced number of important parameters measured or provided by the selected device 13.

Figure 11:
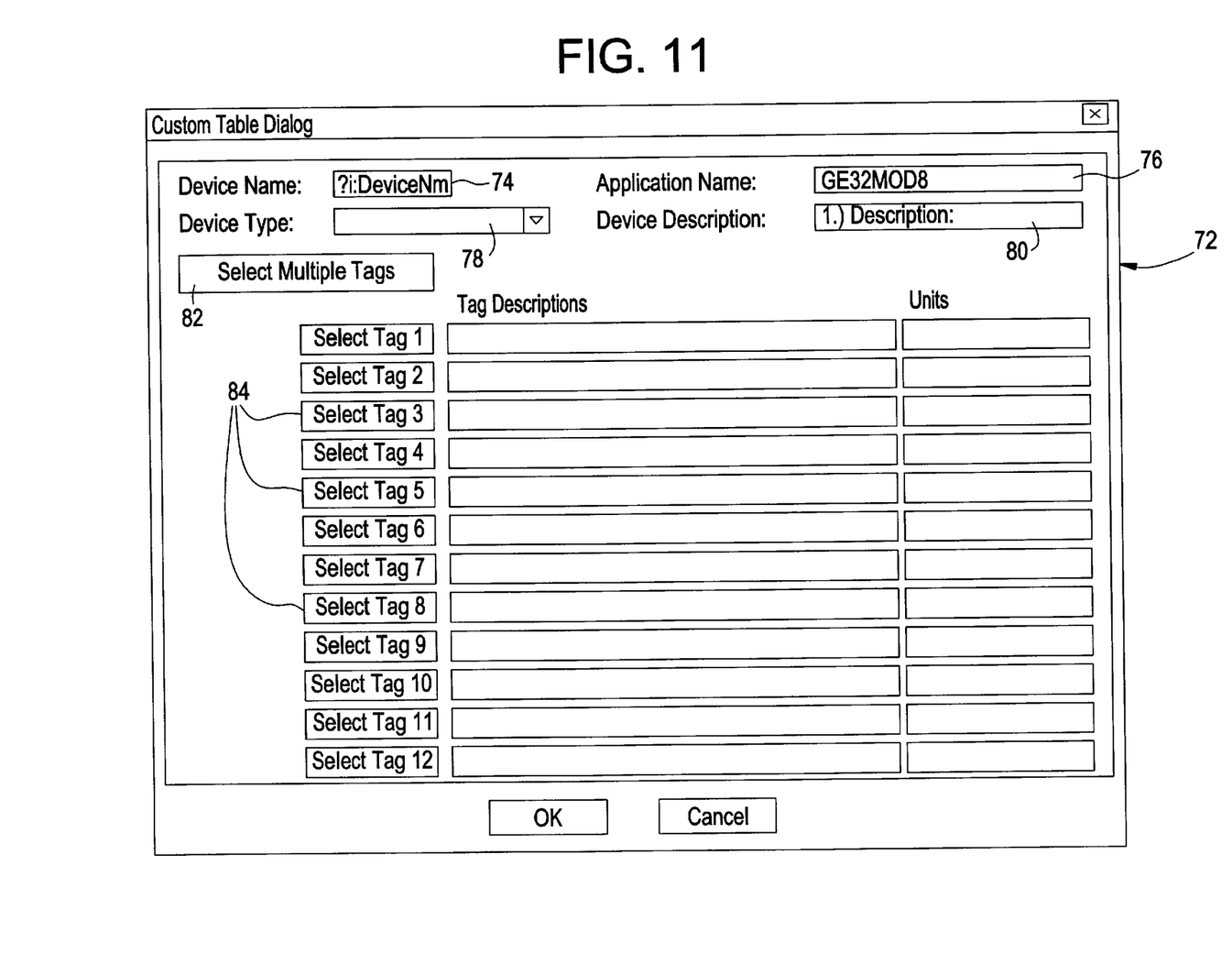
FIG. 11 is a view of a wizard dialog box window generated by the computer software of FIG. 4 for configuring the data displayed in the custom tabular display of a selected device prior to being configured.

As shown in FIG. 3, the integrator drops in the wizard by selecting the Custom Table Wizard from a pull down menu to configure the custom table 12. Upon selection of the Custom Table Wizard, the integrator double clicks on the window 70 of FIG. 3 to present a dialog box 72, as shown in FIG. 11. First, the name of the device 13 for which the custom table 12 is associated with is entered in the "Device Name" field 74 (i.e., "DFP_11B"). Next, the DDE Server Name is entered into the "Application Name" field 76 of the dialog box 72. The corresponding type of device 13 is selected from a pull-down menu 78. The pull-down menu includes a list of all the types of tightly integrated devices 13 (i.e., "DFP100") monitored by the selected DDE Server 76. The integrator may also provide a brief description of selected device in the "Device Description" field 80.

After entering the above information in the four fields, the integrator may select by pointing and clicking on the "Select Multiple Tags" button 82 to select a plurality of device parameters to be displayed in the custom table 12, or select a "Select Tag#" button 84 to select a parameter for the corresponding row of the custom table. For example, the "Select Tag 6" button is selected to define the metered parameter of the selected device for the sixth row of the custom table.

Figure 12:
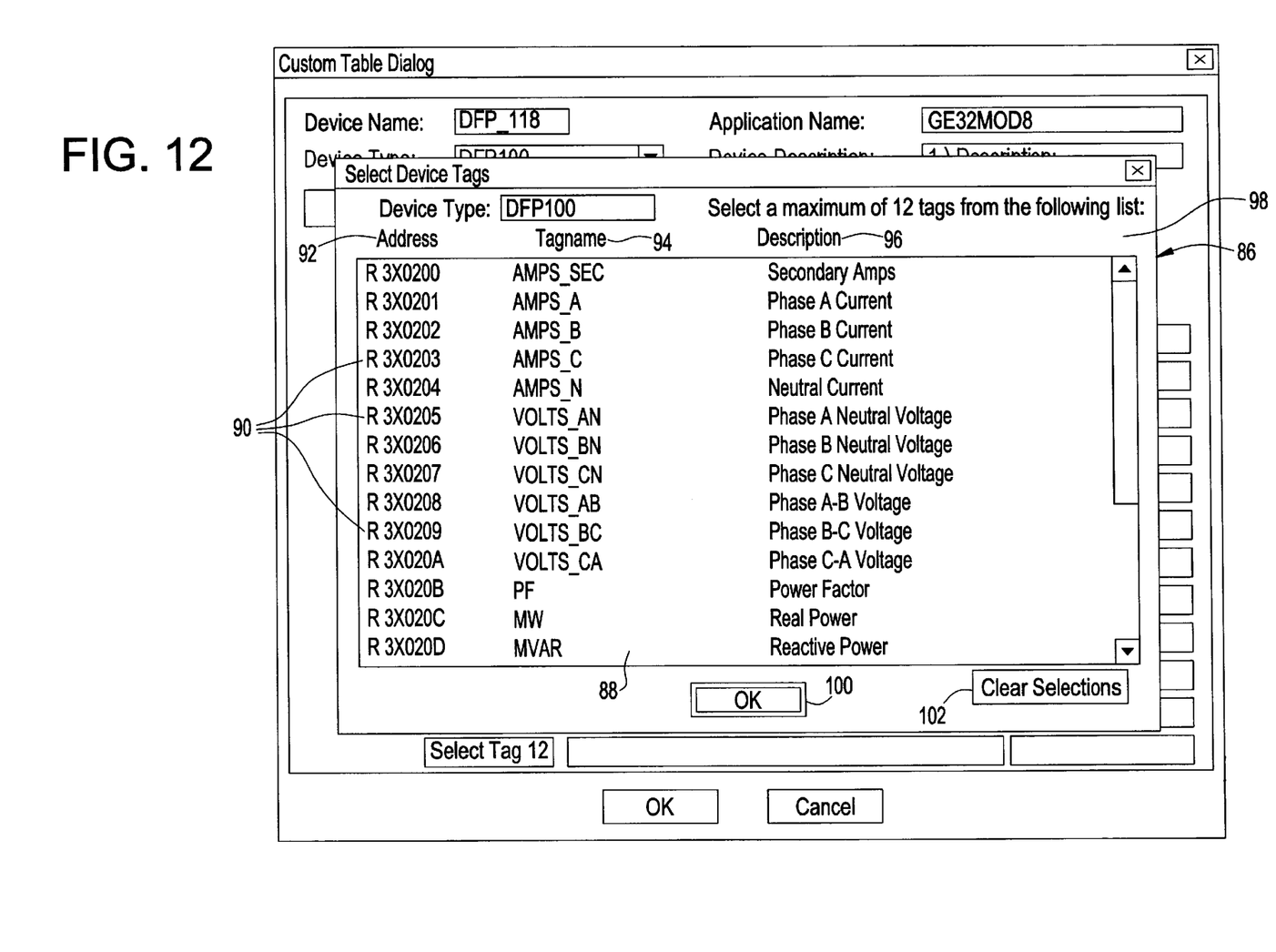
FIG. 12 is a view of a wizard dialog box window generated by the computer software of FIG. 4 for configuring the data displayed in the custom tabular display.

The dialog box 86 labeled "Select Device Tags" of FIG. 12 appears when the "Select Multiple Tags" button 82 (see FIG. 11) is selected. The dialog box 86 provides a list of all the preconfigured tags 90 which the Custom Table Wizard supports for the specified Device Type specified in the "Device Type" field 78 of the dialog box 72 of FIG. 11. Each preconfigured tag 90 provided in the list 88 includes the address 92 of the tag, the tag name 94 and a description of the parameter 96 monitored for the selected device 13. For example, the phase current for the DFP100 device type has a tag name "AMPS_B" and description of "Phase B Current". The tag's address is "R3X0202". The dialog box 86 prompts the integrator to select a maximum of 12 tags from the list at 98. The integrator selects a tag 90 by pointing and clicking a desired tag, which is then highlighted. After the integrator has selected the desired tags (or metering parameters), the integrator selects the "OK" button 100. If the integrator wishes to change the selection, the integrator selects the "Clear Selections" button 102. The list 88 of preconfigured tags 90 is a subset of all the DDE Items supported by the DDE Server for a given device. The list of preconfigured tags comprises primarily of metering value registers (i.e., Present Values). Some registers that have values based on one or more other registers (e.g., ratio scaling) may be supported by the Custom Table Wizard.

A similar dialog box labeled "Select Device Tags" of FIG. 12 appears when any of the "Select Tag#" buttons 84 of dialog box 72 (see FIG. 11) is selected. The same list is provided to the integrator to select the metered parameter to be included in the selected row of the custom table 12. After the integrator has selected the desired tag 90 (or metering parameter), the integrator selects the "OK" button 100.

Figure 13:
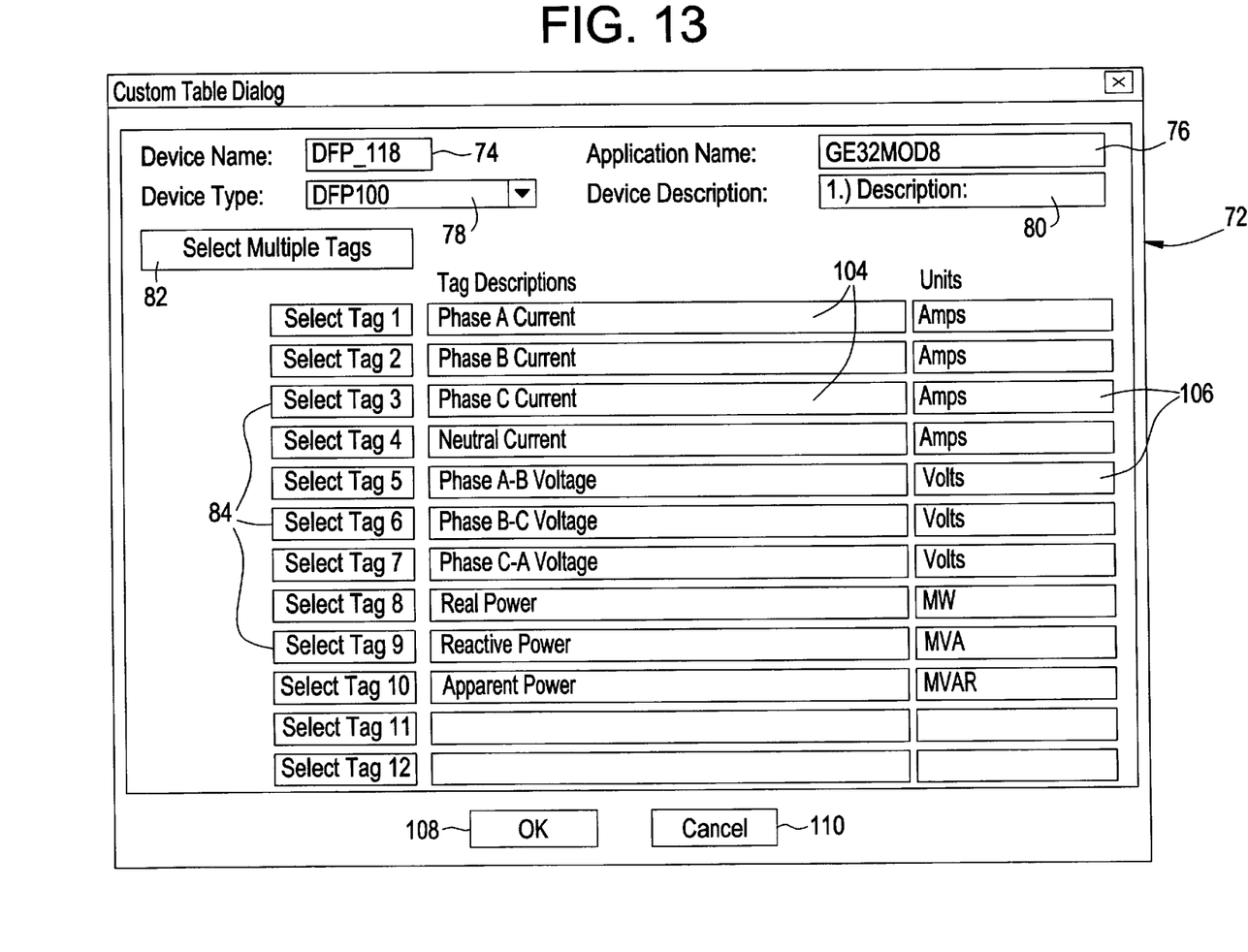
FIG. 13 is a view of a wizard dialog box window generated by the computer software of FIG. 4 for configuring the data displayed in the custom tabular display of a selected device after being configured.

When the preconfigured tags 90 have been selected, the information of the selected tags is entered into the appropriate row of the dialog box 72 of FIGS. 11 and 13. For each tag the Tag Description and the Units of measurement are displayed in the corresponding fields 104, 106. The Tag Descriptions and Units are used when displaying the custom table graphic 12 of FIG. 2. If the integrator finds this configuration of the custom table graphic acceptable, the integrator selects the "OK" button 108. Alternatively the integrator may select the "Cancel" button 110 to reconfigure the entire custom table graphic 12. The integrator may also edit the text of the "Tag Description" or the "Units" by pointing and clicking in the desired field 104, 106. One will note that the editing of these fields do not alter the actual DDE tagname, data format or scaling of the values. The ability to change descriptions and units is particularly useful for non-English applications as well as for cases where the generic description of a register can be clarified. For example, the Custom Table Wizard may have "Analog Input 1" for a description of a register. The integrator may change the description to "Remote Voltage Source A" which can provide a more accurate description of the register, or perhaps the integrator can change the language of the text from English to Spanish.

Another convenient feature of the Custom Table Wizard is its ability to enable the integrator to place the registers in the custom table 12 in any order by configuring each row of the table one row at a time, as described hereinbefore.

The information gathered by the Custom Table Wizard for each device type is provided from files supplied with the wizard. One file contains all the Device Types supported by the pull-down menu 78 of the dialog box 72 of FIGS. 11 and 13. Another file associated with each device type contains all the tag/register information for the specific device type. Since the Custom Table Wizard is file driven, a new device can be added by simply editing the device type file and adding a tag information file for the new device type. This eliminates the need to modify the wizard at all when new devices are added to the power control system.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of generating a custom tabular display of operating data of a device of an electrical distribution system, said method comprising:
   presenting a list including a plurality of devices monitored by a server of a power management control system;
   receiving a first selection of at least one of said plurality of devices;
   presenting a list including a plurality of parameters monitored by said at least one of said plurality of devices;
   receiving a second selection of at least one parameter of said plurality of parameters; and
   displaying a table including data associated with said at least one parameter.

2. The method of claim 1, wherein said presenting a list of parameters includes:
   presenting aspects of power usage in the electrical distribution system.

3. The method of claim 1, further comprising:
   retrieving said data associated with said second selection from a memory register.

4. The method of claim 3, further comprising:
   receiving a server name selection and a device name selection for defining an address of said memory register.

5. The method of claim 3, further comprising:
   establishing a link between said table and said memory register.

6. The method of claim 1, wherein presenting said list of parameters includes:
   presenting an address of a common memory register, an item name and a description of said parameters.

7. The method of claim 1, wherein said receiving said second selection includes:
   receiving a parameter for display at a select row of said table.

8. The method of claim 1, wherein said presenting said list of parameters includes:
   displaying between 1 and 12 parameters.

9. The method of claim 1, wherein said displaying said table includes:
   displaying a description of said at least one parameter, a value of said at least one parameter and units of said at least one parameter.

10. The method of claim 9, further comprising:
    editing said description of said at least one parameter.

11. The method of claim 9, further comprising:
    editing said units of said at least one parameter.

12. A power management control system comprising:
    an electrical distribution system;
    a computer network;
    an intelligent electronic device operatively coupled to said electrical distribution system and to said computer network; and
    a processor operatively coupled to said computer network, wherein said processor presents a list of devices including said device, receives a first selection indicating said device, presents a list of parameters of said device, receives a second selection of at least one parameter from said list of parameters, and presents a table including data associated with said at least one parameter.

13. The power management control system of claim 12, wherein said data includes aspects of power usage in said electrical distribution system.

14. The power management control system of claim 12, further comprising:
    a memory register; and
    wherein said processor retrieves said data from said memory register.

15. The power management control system of claim 14, wherein said processor receives a server name selection and a device name selection for defining an address of said memory register.

16. The power management control system of claim 12, wherein said processor establishes a link between said table and said memory register.

17. The power management control system of claim 12, wherein said list of parameters includes an address of a common memory register, an item name and a description of parameters in said list of parameters.

18. The power management control system of claim 12, wherein said processor presents said at least one parameter at a selected row of said table.

19. The power management control system of claim 12, wherein said processor presents between 1 and 12 parameters.

20. The power management control system of claim 12, wherein said processor presents a description of said at least one parameter, a value of said at least one parameter and units of said at least one parameter.

21. The power management control system of claim 20, wherein said processor receives an edited description of said at least one parameter and presents said edited description in said table.

22. The power management control system of claim 20, wherein said processor receives an edited unit of said at least one parameter and presents said edited unit in said table.

23. A storage medium encoded with machine-readable computer program code for generating a custom tabular display of operating data of a device of an electrical distribution system, said storage medium including instructions for causing a computer to implement a method comprising:

presenting a list including a plurality of devices monitored by a server of a power management control system;

receiving a first selection of at least one of said plurality of devices;

presenting a list including a plurality of parameters monitored by said at least one of said plurality of devices;

receiving a second selection of at least one parameter of said plurality of parameters; and displaying a table including data associated with said at least one parameter.

24. A power management control system comprising:

an electrical distribution system;

a computer network;

means for providing a plurality of data items indicating aspects of said electrical distribution system to said computer network;

means for displaying a table of data;

means for customizing said table of data to include any one of said plurality of data items.

* * * * *